July 30, 1940.   E. J. DILLMAN   2,209,767
THERMOSTAT
Filed Dec. 19, 1936
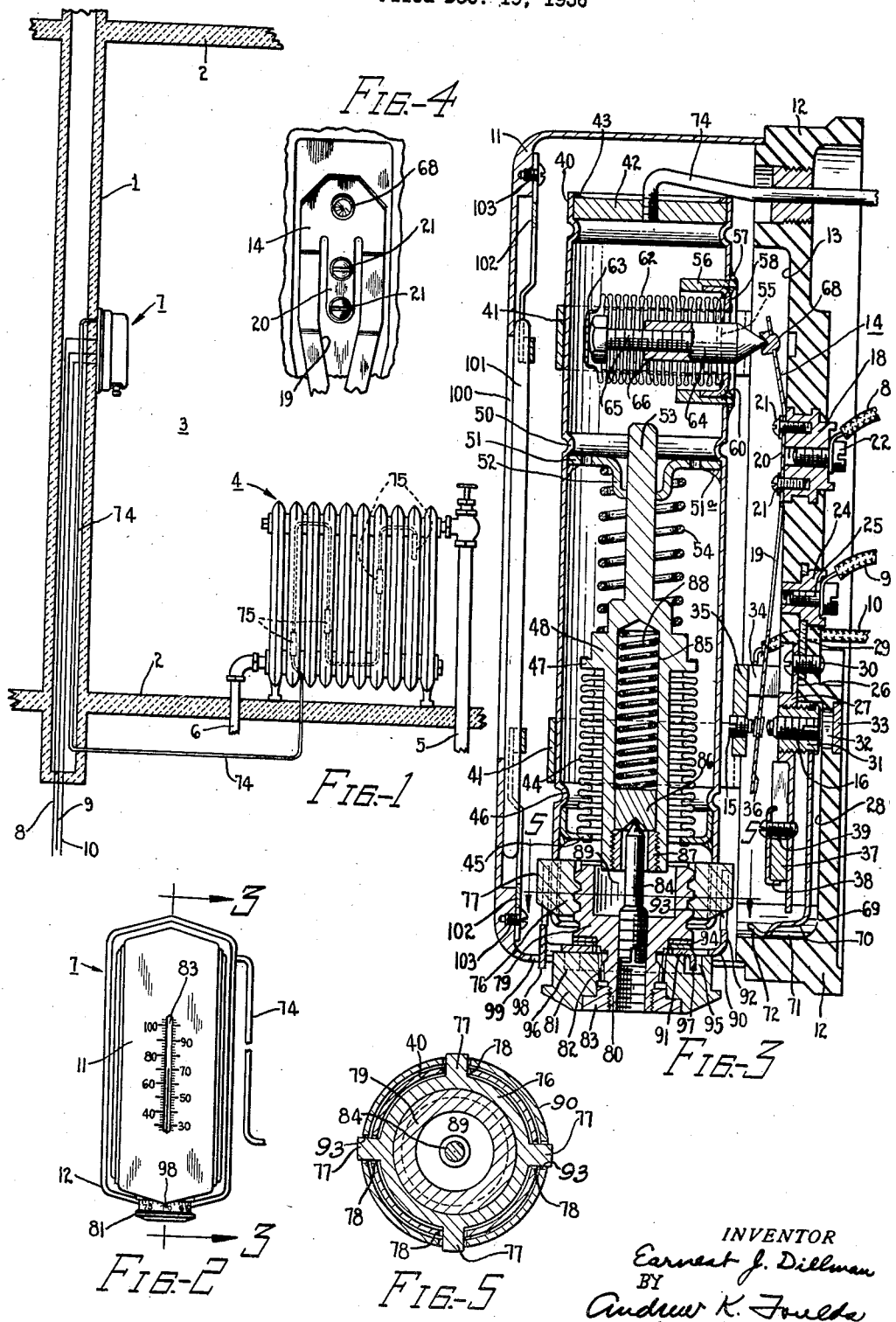
INVENTOR
Earnest J. Dillman
BY Andrew K. Foulds
his ATTORNEY Patented July 30, 1940

2,209,767

UNITED STATES PATENT OFFICE 2,209,767

THERMOSTAT

Earnest J. Dillman, Detroit, Mich., assignor to Detroit Lubricator Company, Detroit, Mich., a corporation of Michigan Application December 19, 1936, Serial No. 116,751

13 Claims. (Cl. 200—140)

My invention relates generally to control devices and more particularly to thermostats for controlling the temperature of a room, or other enclosed space.

One of the objects of my invention is to provide a new and improved thermostat for controlling the operation of a heating system and one which will maintain a more constant temperature in a room or other enclosed space to be heated.

Another object of my invention is to provide a new and improved room thermostat which is responsive both to the temperature of the ambient air in a room and to the temperature of a heating fluid.

Another object of my invention is to provide a thermostat of the above mentioned character of new and improved construction.

Another object of my invention is to provide a thermostat having new and improved adjusting means for setting the thermostat.

Another object of my invention is to provide a thermostat having a new and improved arrangement of the operating and associated parts thereof.

The invention consists of the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 1 is a view of a portion of a building and part of a heating system employing my improved thermostat;

Fig. 2 is a view shown in front elevation of my thermostat proper;

Fig. 3 is an enlarged view shown in vertical central cross section of my thermostat and taken along the line 3—3 of Fig. 2;

Fig. 4 is a fragmentary view in elevation showing certain structural details of my thermostat, and Fig. 5 is a view shown in cross section of my thermostat and taken along the line 5—5 of Fig. 3.

Referring to the drawing, in Fig. 1 there is shown a portion of a building including a vertical, hollow wall or partition 1 and floors 2, enclosing in part a room 3 in which there is a heat exchange element or radiator 4. The radiator 4 may be connected by branch supply and return pipes 5 and 6, respectively, to a main supply and return line (not shown) connected to a source of heating medium preferably steam, such piping systems being well known and forming no part of the present invention. The supply of steam or other heating medium to the radiator 4 may be controlled in any suitable manner, but is preferably controlled by an electrically operated device. For example, an electrically operated valve located in the main heating fluid supply line may be employed to control the supply of steam to the radiator 4, or an electrically operated stoker or blower may be employed, these devices not being herein shown or described in detail since they are well known devices in the art to which this invention appertains.

My thermostat, designated in general by the numeral 7, is shown mounted on the wall 1 within the room 3, and this thermostat is designed, in the present instance, to control the operation of a heating system fuel supply means controlled by an electrically energized means such as an electric motor (not shown). The thermostat 7 and the electric motor are electrically connected by the well known, three-wire system comprising lead wires 8, 9 and 10 which provide two circuits, one of which is closed by the thermostat to start the fuel supply means and the other of which is closed by the thermostat to stop the fuel supply means.

Referring now to Fig. 3 of the drawing, my thermostat includes a casing comprising a removable, box-like cover 11 and a supporting member or base 12, the cover and base preferably being of general rectangular shape, as shown. The base 12 forms one side or back of the casing 11 and may be constructed of any suitable electric insulating material. The cover 11 and base 12 may be held together in any suitable manner and, in the present instance, the cover fits onto the base and is frictionally held thereto so that the cover may be readily removed from the base without the necessity of removing screws or other suitable attaching means. The rear face or back of the base 12 is preferably formed to lie flat against a room wall or other surface, and the front face of the base is preferably recessed longitudinally thereof, providing a recessed wall 13. Carried or supported by the base 12 there is a controlling means or switch comprising in general an actuated switch arm or blade 14 and a pair of spaced contact members 15 and 16.

Secured in and to the base 12 there is a terminal post 18 to which the blade 14 is secured, the inner end of the post 18 preferably being substantially flush with the recessed wall 13. The switch blade 14 is preferably formed of a resilient or flexible metal, preferably of general rectangular shape, and the blade is disposed within and extends longitudinally of the recess in the front face of base 12. Preferably the blade 14 is provided with an elongated opening 19 extending longitudinally thereof adjacent its upper end, and near the upper end of the blade the opening 19 branches into two spaced, substantially parallel slots leaving an integral, downwardly directed portion or tab 20. The tab 20 lies flat against the inner end of the terminal post 18 and is provided with two vertically spaced apertures for receiving screws 21 that screw thread into the terminal post to secure the blade 14 thereto. Screw threaded into the terminal post 18 from the back of base 12 there is a binding post or screw 22 for attaching the lead wire 8 to the binding post. At a point slightly above the upper screw 21 the switch blade 14 is preferably bent inwardly so that it extends at an angle to the tab 20 and wall surface 13, and similarly the switch blade 14 is bent inwardly at a point slightly below the lower screw 22 to extend at an angle to the tab 20 and wall surface 13.

Secured in and to the base 12 at a point below and spaced from the terminal post 18 there is another metallic terminal post, designated by the numeral 24, and screw threaded into the post 24 from the back of base 12 there is a binding post or screw 25 for attaching the lead wire 9 to the post 24. Slightly below the post 24 the wall 13 is recessed or stepped, as at 26, for receiving a supporting member, preferably a metallic plate 27, that lies flat against the recessed wall 26. The base 12 is preferably still further recessed adjacent its lower end, providing a recessed wall 28, and the plate 27 overhangs the recessed wall 26 and a lower portion thereof overlies the recessed wall 28, as shown in Fig. 3. Molded in the base 12 there is a jumper strip 29 that electrically connects the terminal post 24 and plate 27. Adjacent its upper end the jumper strip 29 has an aperture for receiving the post 24, and a lower end portion of the strip 29 overlaps and engages an upper end portion of plate 27. The plate 27 and strip 29 may be provided with aligning apertures for receiving a screw 30 which may be screw threaded into the base 12, clamping the plate 27 and strip 29 together and securing the plate to the base. Intermediate its upper and lower ends the plate 27 is provided with a threaded aperture for receiving an externally threaded member 31, the outer end of which is disposed adjacent the recessed wall 28. The member 31 is provided with a centrally disposed, threaded aperture therethrough for receiving the contact member 16 which is preferably a screw, as shown, and the inner end of the screw or contact member 16 projects beyond or past the inner face of plate 27. In the base 12 there is preferably provided an aperture 32 registering with the outer end of the screw 16 and through which aperture a tool, such as a screw driver, may be inserted to adjust the contact member 16. After the contact member or screw 16 has been properly adjusted, the aperture 32 is preferably closed by a closure member or plug 33 that is preferably tightly sealed in and secured to the base 12 so as to discourage its removal and prevent persons from tampering with or changing the setting or desired position of the contact member 16. Rigidly secured to the base 12 there is a metallic bracket 34 that projects forward from the face of the base and has a portion 35 in spaced, substantially parallel relation thereto. The contact member 15, like contact member 16, is preferably a screw, as shown, and is adjustably screw threaded into the portion 35 in spaced relation to and in substantial alignment with the contact member 16. The lead wire 10 may be connected to the bracket 34 and in any suitable manner, such as by solder. The lower or free end of the switch blade 14 extends between the opposed, spaced ends of the contact members 15 and 16 and has a lower end portion 36 that extends below the contacts and constitutes an armature portion for attraction by a magnet 37. The magnet 37 which is of the U-shaped type, in the present instance, is carried by the plate 27 and may be secured thereto by clamping it flat against the lower portion of the plate 27 by a clip 38 and a screw 39 that may extend through the clip and screw thread into the plate 27. The arms of the U-shaped magnet 37 preferably extend upwardly and overlie a lower end portion of the blade armature portion 35, and the magnet is employed to attract and positively hold the blade 14 in engagement with the contact member 16 to prevent sparking of the contacts, and also to provide for a temperature differential between the temperature at which the blade 14 engages contact 16 and the temperature at which contact is broken therebetween.

Disposed within the thermostat casing there is a temperature responsive element including a container or bulb 40 for containing a temperature responsive, expansible-contractible fluid which may be kerosene. The container 40 may be of tubular form, as shown, and preferably extends longitudinally of and substantially coextensive with the base 12 in advance of or spaced from the front face thereof. Metallic straps 41, or other suitable means may be employed to rigidly secure the container 40 to the base 12. The upper end of the tube or container 40 is closed by a closure member or plug 42 that is preferably secured and sealed to the tube by solder 43, or other suitable sealing means, to insure a fluid-tight joint between the closure plug and the inner wall of the tube. The other or lower end of the container 40 is closed and sealed by a metallic bellows member 44 disposed within the container, and the bellows 44 also serves to prevent increase in pressure in the container above a predetermined pressure which might otherwise injure the device.

Positioned within the container 40 adjacent its lower end there is a supporting member 45 for the bellows 44, the supporting member being in the form of an annular plate extending transverse to the longitudinal axis of the tubular container 40. Above the supporting member 45 the side wall of container 40 is preferably formed having an annular, inwardly directed, indented portion 46 providing an internal shoulder or abutment for the supporting plate 45. The plate 45 preferably has an upturned annular flange that fits tightly against the inner wall surface of the tubular container 40 and the edge of the flange abuts the annular abutment 46. Preferably solder, or other suitable sealing material is provided between the inner wall surface of the container 40 and the supporting plate 45 to insure a fluid-tight connection therebetween. The supporting plate 45 is provided with a central aperture therethrough and the bellows 44 has one end hermetically secured and sealed to a border portion of the supporting plate around the aperture therethrough. The bellows 44 extends vertically upward within the container 40 and its upper or free end is hermetically secured and sealed to an external flange 47 of a movable member or rod 48. The rod 48 extends downward, centrally through the bellows 44 and the aperture in the supporting plate 45. Above the upper end of the bellows 44 the side wall of the tube or container 40 is provided with another inwardly directed circumferential indentation 50 providing an abutment or seat for a plate member 51 that extends transverse to the longitudinal axis of the container. The plate 51 may be secured to container 40 by solder 51a, or by other suitable means. Preferably the transverse wall or plate 51 is provided with a centrally disposed, downwardly directed tubular extension or embossed portion 52 having an aperture in its lower end wall, and the rod 48 has an upwardly extending rod portion 53 that is slidably received and guided in the aperture in plate member 51. A helical coil spring 54 surrounds the rod portion 53 with one end abutting plate 51 and the other end abutting an upwardly facing external shoulder of the rod 48. The coil spring 54 is under compression and acts to compress the bellows 44.

Above the transverse wall or plate 51 the side wall of container 40 is provided with an aperture or opening 55 therethrough that is disposed toward or registers with an upper end portion of the switch blade 14. Positioned in the aperture 55 there is a tubular member 56 that projects slightly externally of the container 40 for receiving solder 57, or other suitable means, for securing the tubular member to the container in a fluid-tight manner. The bore of the tubular member 56 has an outer end portion of enlarged diameter, and fitted therein there is a supporting member in the form of a plate 58 having a centrally disposed aperture therethrough. The plate 58 has an annular flange, the outer surface of which fits tightly against the wall of the bore of larger diameter, and the edge of the flange abuts the internal shoulder between the bores of different diameter. Solder 60, or other suitable sealing means may be provided in the space around the outer end of the plate 58 and the inner wall surface of the tubular member 56 to hermetically secure and seal the parts together.

Disposed within the container 40 and sealing the opening in the supporting plate 58 there is a pressure responsive means, preferably a metal bellows 62 on which the thermostatic fluid in the container acts, and the bellows 62 is smaller or has less surface area than the bellows 44 for a purpose to be hereinafter described. One end of the bellows 62 is hermetically secured and sealed to a border portion of the plate 58, around the aperture therethrough, and the other or free end of the bellows is hermetically secured and sealed to a movable end wall or plate member 63. Within the bellows 62 there is a loosely disposed thrust member 64 through which compression movement of the bellows is transmitted to the switch blade 14. The thrust member 64 is preferably of sectional construction comprising a screw 65 and a rod portion 66 having a threaded bore opening at one end for receiving the screw. By constructing the thrust member 64 in sections, as above mentioned, it will be seen that the length of the thrust member may be varied as desired. As shown, the head of screw 65 may abut the bellows movable end wall 63 and the thrust rod extends from wall 63 centrally through the bellows and projects externally of the container through the aperture in the bellows supporting plate 58. The outer end of the thrust rod 64 is preferably pointed, or of conical form, to engage in the recess of a socket member 68 that is secured in and to the switch blade 14 adjacent the upper end thereof.

When the pressure of the thermostatic fluid in the bulb or container 40 increases to a predetermined pressure, determined by the setting of the thermostat, the force of magnet 37 will be overcome and the blade 14 will be flexed in a clockwise direction, as seen in Fig. 3, breaking contact with the contact 16 and making contact with contact 15 to stop the supply of the heating medium to the radiator. Upon a predetermined decrease in the pressure exerted by the fluid in container 40, the bellows 62 will expand permitting magnet 37 to attract and hold blade 14 in contact with the contact 16 to start the supply of heating medium to the radiator 4. The differential between the temperature at which blade 14 will engage contact 15 and the temperature at which it will engage contact 16 is determined, as previously mentioned, by magnet 37 and, as is well known, the holding force of the magnet will be proportional to the square of the distance between the magnet and the blade 14. When the contact member 16 is moved away from the contact member 15 it will be seen that when blade 14 engages contact 16 the blade will be closer to the magnet 37, with the result that the holding force of the magnet will be increased requiring a greater force to break contact between the blade 14 and contact 16. In order to change or vary the above mentioned differential, I provide a manually operable lever member 69 by means of which the contact 16 may be moved toward or away from blade 14. The lever member 69 is preferably formed of a strip of sheet metal and at one end is provided with an aperture to receive an outer end portion of the rotatable member 31 in which contact 16 is adjustably screw threaded. The lever member 69 is rigidly secured to the member 31 and depends therefrom between the base recessed wall 28 and the supporting plate 27. At its lower end the lever member 69 preferably has a forwardly extending arm portion 70 that extends under the lower end of plate 27 to a point adjacent the front face of base 12. The arm portion 70 is disposed adjacent the upper wall surface, designated at 71, of the bottom wall of base 12 and has a downwardly directed, indented or extended portion 72 for frictionally engaging wall 71 to hold contact 16 in a desired position. The extended portion 72 is preferably convex so as to reduce friction between the wall surface 71 and the lever 69, the wall surface 71 preferably having an arcuate or concave surface for engagement by the extended portion 72.

Connected to the container 40 there is a tube or conduit 74 that may have one end screw threaded and hermetically sealed in the top closure plug 42 of the container. In the conduit 74, adjacent its other end, there is a plurality of spaced temperature responsive bulb elements 75, there being four of these bulbs in the present instance. The bulbs 75 are to be arranged in good heat transfer relation with the heating fluid and, as shown in Fig. 1, are preferably secured to the radiator 4 and arranged in spaced relation along the length of the radiator so that the bulbs, taken together, will reflect the mean or average temperature of the radiator. The container 40, conduit 74 and bulbs 75 are completely filled or charged solid, as it is commonly stated, with the aforementioned thermostatic fluid, and the closed system remain completely filled even upon contraction of the thermostatic fluid, for the resilient blade 14 and magnet 37 act to expand the bellows 62 on contraction of the fluid. In this connection it will be seen that the force exerted by the liquid in container 40, acting to compress bellows 62, and the opposing forces of the tensioned blade 14 and magnet 37, maintain the blade 14 and the bellows movable end wall 63 in engagement with the opposite ends of the loosely disposed thrust member 64.

Positioned within the container 40 and closing the lower end thereof there is a supporting member 76 having a centrally disposed, threaded aperture therethrough in alignment with the bellows 44. The supporting member 76 is formed having a plurality of spaced, external lugs 77 projecting laterally or from its outer side wall, and these lugs position in spaced, elongated or slot-like apertures 78 in the side wall of the container 40 to prevent rotation of the supporting member 76, the apertures 78 running out at the lower end of the container. The upper surfaces of the lugs 77 engage the container wall at the upper ends of the slots 78 to prevent upward movement of the supporting member 76 and the lower end of the container 40 is bent inwardly around its periphery to prevent downward movement of the supporting member 76. Screw threaded into the supporting member 76 there is a stem member 79 that extends downwardly and has a reduced lower end portion 80 projecting externally of the casing. A knob 81 may be splined, as at 82, onto the lower end portion 80 of the stem 79 externally of the casing, and screw threaded onto the stem portion 80 there is a nut 83 that supports the knob 81.

The stem 79 has a threaded aperture longitudinally therethrough for receiving an abutment or thrust member 84 that extends upwardly in longitudinal alignment with the movable rod member 48. The rod member 48 has a bored recess 85 longitudinally thereof that opens through its lower end, and disposed in the bore 84 there is a plunger member 86. Screw threaded into the bore 85 and positioned at the lower end of member 48 there is a tubular seat or stop member 87 for the plunger 86. The thrust member 84 extends longitudinally through the tubular seat member 87 and its upper end is preferably pointed or conical to engage in a socket or conical recess in the lower face of the plunger 86. Within the bore 85 above the plunger 86 there is a helical coil spring 88 having one end engaging the plunger 86 and the other end abutting the recessed end wall of bore 85. The spring 88 is under compression and is a stronger spring, or exerts a greater force than spring 54, to transmit movement of the adjustment or setting means to the bellows 62. In the vent that the thermostatic fluid reaches a relatively high temperature, as may be the case in summer, the increased fluid pressure will overcome spring 88 and compress the bellows 44 thus increasing the volumetric capacity of container 40 to allow the fluid to expand without undue increase in the pressure exerted thereby. By reason of the relatively large surface area of bellows 44 compared to the bellows 62, the fluid in bulb 40 will exert a greater force on the bellows 44 than it will exert on the bellows 62, with the result that upon undue increase in fluid pressure, bellows 44 will be compressed to relieve the pressure. To permit the rod member 48 to move downward while spring 88 is compressed, the upper end of the stem may be provided with a recess 89 to receive the rod member 48.

Surrounding a lower end portion of the container 40 there is a cup-shaped member 90 having an end wall 91 and having an upturned, annular flange 92. The upturned annular flange 92 has spaced, elongated or slot-like apertures 93 that run out at the upper edge thereof and receive the lugs 77 of the fixed supporting member 76 to prevent rotation of member 90. Above the end wall 91 the stem 79 is formed having an external, downwardly facing annular shoulder, and between this shoulder and the upper face of end wall 91 there is preferably provided a pair of friction washers 94 to prevent the stem from being too easily rotated. In the upper face of the knob 81 there is a slot 95 that is circular in shape, as seen from the upper face of the knob, but which is not continuous, there being a wall portion or abutment 96 that interrupts the continuity of the slot and serves as a stop for knob 81. The end wall 91 of the cup-shaped member 90 has a downturned lug 97 that positions in the slot 95 to engage with one or the other of the opposite surfaces or sides of the stop or wall 96 to limit rotary movement of the knob 81 in opposite directions.

Spaced around the outer cylindrical surface of the knob 81 there is indicia, in this instance numerals designating the temperature range of setting of the thermostat, and the cup-shaped member 90 has a downturned lug 98 which may serve as a pointer for cooperation with the indicia on the knob 81. The cover 11 has a slot-like aperture 99 in its lower wall for receiving the knob 81, the aperture 99 running out at the rear edge of the cover. In the front wall of cover 11 there may be provided a vertically extending, elongated or slot-like aperture 100, back of which there may be a thermometer tube 101 that may be held at top and bottom to the cover by resilient clips 102 secured to the cover by screws 103. The cover 11 may be provided with indicia or numerals on its front face for cooperation with the thermostatic fluid in tube 101 to indicate the temperature of the ambient air.

By rotating the knob 81 the bellows 44 may be expanded or collapsed to change the volumetric capacity of the container 40 and thereby change the temperature setting of the instrument, or the temperature at which the room is to be maintained. If the knob 81 is rotated in one direction the bellows 44 will be collapsed by spring 54, increasing the volumetric capacity of container 40 which will require that the thermostatic fluid volume must increase by an amount corresponding to the increase in volumetric capacity of the container before the pressure can be great enough to actuate the switch blade 14 and stop the supply of heat to the room. Or in other words, increasing the volumetric capacity of container 40 will correspondingly raise the room temperature at which the thermostat will stop the supply of heating fluid to the radiator. Conversely, decreasing the volumetric capacity of container 40 decreases or lowers the temperature at which the switch will be actuated to stop the supply of heating medium to the radiator. When the knob 81 is rotated, the knob, stem 79, thrust member 84 and cup-shaped member 90 move vertically or rectilinearly since member 76 is held against rotation, the cup-shaped member 90 being prevented from rotating by the lugs 77 of the fixed supporting member 76.

It will now be seen that the room air temperature responsive container or bulb 40 and the radiator temperature responsive bulbs 75 are correlated to control the operation of the switch blade 14 and therefore control flow of the heating medium to the radiator. The volumetric capacity of the room bulb or container 40 should be and is made about fifty times the sum of the capacities of the radiator bulbs 75. By employing a large body of thermostatic fluid in the container 40 the instrument will be very sensitive and the switch will be actuated upon a change in the temperature of container 40 of about one-fifth of a degree. The bulbs 75, having one-fiftieth the capacity of container 40, will require a change of temperature at the radiator of 10° F. to actuate the switch. The instrument is adjusted so that when it is set by the knob 81 for 70° F. the switch will be actuated when the temperature of the fluid in or of container 40 is 70° F. provided that the mean temperature of the radiator bulbs 75 is about 150° F. If the temperature of container 40 decreases one degree, the liquid in the container will contract to such an extent that a 50° F. temperature rise of the liquid in bulbs 75 will be necessary to expand the total volume of thermostatic liquid sufficient to bring the control to its mean operating point. Also, if the temperature of container 40 rises one degree to open the switch, a decrease of 50° F. of the liquid in bulbs 75 will be necessary to bring the instrument again to its mean operating point. When the liquid in container 40 is at the desired temperature of 70° F. the switch will thereafter be actuated upon a change in radiator temperature of 10° F. and the liquid in container 40 will remain at a substantially constant temperature, or will remain at substantially room temperature or 70° F. When this point is reached there will be, at least theoretically, no change in the temperature of the liquid in container 40 and the room air temperature, which will then also be substantially 70° F., will be controlled in accordance with the changes in the temperature of the radiator. It will of course be understood that the change in liquid temperature will not necessarily be entirely in the bulbs 75 or in the liquid in container 40, but that both may change and contribute to the change necessary for actuating the switch.

While I have shown and described my thermostat in detail in conjunction with a steam heating system, it is to be understood that my thermostat may be employed with heating systems using other heating fluids, or it may be employed with cooling systems, and that the invention is to be limited only by the appended claims.

What I claim and desire to secure by Letters Patent of the United States is:

1. A thermostat comprising a casing, switch means for controlling an electric circuit, a bulb element of relatively large volumetric capacity within said casing for subjection to the temperature of the air in a space in which the temperature is to be controlled, a second bulb element of small capacity for subjection to the temperature of a heat exchange medium for the space, said large bulb element having a volumetric capacity many times the volumetric capacity of said small bulb element, said bulb elements being communicatively connected in a closed system completely filled with a temperature responsive expansible-contractible liquid, pressure responsive movable means closing a wall aperture in said first-named bulb element and operatively connected to said switch means, movable means for said first-named bulb element operable to change the volumetric capacity of said first-named bulb element at which said liquid will operate said pressure means to control said switch means, and means for moving said last-named movable means.

2. A thermostat comprising a supporting means, controlling means operable to control the supply of a heating medium for heating an enclosed space, a closed system for an expansible-contractible liquid, said system including a bulb element carried by said supporting means and responsive to the temperature of the ambient air of the space to be heated, a bulb element for heat transfer relation with the heating medium and forming a part of said closed system, a temperature responsive expansible-contractible liquid filling said closed system, pressure responsive means forming part of the wall of said first-named bulb element and acted on by the pressure of said liquid for actuating said controlling means, means for varying the volume of said system, means adjustably secured to and manually movable in one direction relative to said supporting means and operable to move said varying means in said one direction, said adjustably secured means being so constructed and arranged relative to said supporting means that force exerted by or through said varying means is ineffective to move said adjustably secured means, and lost motion means connecting said adjustably secured means and said varying means so that upon a predetermined pressure in said system the volume of said system may be increased irrespective of the setting of said adjustably secured means.

3. A thermostat comprising a supporting means, controlling means operable to control the supply of a heating medium for heating an enclosed space, a closed conduit system completely filled with a thermostatic liquid, said system including a bulb element carried by said supporting means and responsive to the temperature of the ambient air of the space to be heated, a bulb element in heat transfer relation with the heating medium and forming a part of said closed system, pressure responsive means within said first-named element and closing an aperture in the wall of said first-named element and acted on by the pressure of said liquid, said pressure responsive means being operable upon movement to actuate said controlling means, one of said bulb elements having an expansible-collapsible member, thrust means for moving said member to decrease the volume of said system, and means interconnecting said member and said thrust means whereby said system volume is permitted to increase subsequent to said system pressure reaching a predetermined pressure greater than that required to actuate said pressure responsive means.

4. A thermostat comprising a controlling means operable to control the supply of a heating medium to an enclosed space to be heated, a closed thermostatic conduit system completely filled with liquid and including a bulb element of relatively large volumetric capacity responsive to the temperature of the ambient air of the space to be heated, a bulb element of small volumetric capacity relative to said first-named element and for subjection to the heat of the heating medium and forming a part of said closed system, movable pressure responsive means closing a wall aperture in said first-named bulb element and operatively connected to said controlling means, expansible-contractible means closing a wall aperture in said first-named bulb element and operable to vary the temperature at which the volume of said liquid in said closed system will move said pressure means to control said controlling means, thrust means for moving said last-named means in one direction, and yieldable means opposing movement of said expansible-contractible means in a direction opposite to said one direction upon increase in temperature of said liquid and operable to allow movement of said expansible-contractible means relative to said thrust means upon a predetermined liquid pressure greater than the pressure required to operate said controlling means thereby to prevent rupture of said closed system.

5. In a thermostat, a supporting means, a bulb element carried by said supporting means, a quantity of temperature responsive expansible-contractible fluid in said bulb element, controlling means, a movable pressure responsive means forming a portion of the wall of said bulb element and having a relatively small surface area acted on by said fluid, said pressure responsive means being operatively connected to said controlling means, a second movable pressure responsive means forming a portion of the wall of said bulb element and having a relatively large surface area acted on by the pressure of said fluid, and yieldable means acting to move said second-named pressure means and opposing the force exerted by said fluid, said yieldable means being yieldable upon a predetermined increase in the fluid pressure so that said second-named pressure responsive means can move to increase the volumetric capacity of the space as the volume of said fluid increases.

6. In a thermostat, a supporting means, a bulb element carried by said supporting means, a quantity of temperature responsive expansible-contractible fluid in said bulb element, control means, a bellows member of relatively small surface area acted on by the pressure of said fluid and operatively connected to said controlling means, a bellows member having a relatively large surface area acted on by the pressure of said fluid, and yieldable means acting to move said last-named bellows member in one direction and yieldable upon increase of the fluid pressure to a predetermined pressure so that said second-named bellows member can move in the opposite direction to increase the volumetric capacity of the space as the volume of said fluid increases.

7. In a thermostat having a controlling means, a bulb element having an opening in a wall thereof, pressure responsive means sealing and closing the opening in said bulb element, a second pressure responsive means acted on by the fluid pressure and operatively connected to said controlling means, said first-named pressure responsive means and said second-named pressure responsive means cooperating with said bulb element to provide an enclosed space of variable volumetric capacity for said fluid, a movable thrust member connected to said first-named pressure responsive means and having a bore and a seat, a plunger member in said bore, spring means in said bore and acting to hold said plunger member on said seat, and manually operable means for moving said first-named pressure responsive means to vary the volumetric capacity of the enclosed space containing said fluid at which said fluid will control said first-named pressure responsive means to operate said controlling means, said manually operable means including a thrust member engaging said plunger member, said spring means being yieldable upon a predetermined increase in the fluid pressure so that said first-named pressure responsive means can move relative to said plunger member to increase the volumetric capacity of the space as the volume of said fluid increases to prevent undue pressure increase.

8. In a thermostat having a controlling means and a thermostatic bulb for operating said controlling means, means for varying the volumetric capacity of said bulb to change the temperature setting of the thermostat comprising, a movable member cooperable with said bulb to form therewith an enclosed space of variable volumetric capacity for containing a thermostatic fluid, the volumetric capacity of said space being variable by movement of said movable member, a fixed supporting member, a rotatable and rectilinearly movable stem screw threaded into said supporting member and operatively connected to said movable member, a cup-shaped member surrounding said stem and movable rectilinearly therewith, said supporting member and said cup-shaped member having cooperating means to prevent rotation of said cup-shaped member, a pointer means and a stop member formed out of said cup-shaped member, and a knob secured to said stem and having indicia cooperable with said pointed means and an abutment cooperable with said stop member.

9. A thermostat comprising, a bulb element of relatively large volumetric capacity for heat transfer relation with the air in a space in which the temperature is to be controlled, a second bulb element of small volumetric capacity relative to said first-named element for heat transfer relation with a heat transfer medium, said large bulb element having a volumetric capacity many times the volumetric capacity of said small bulb element, said bulb elements being communicatively connected and being charged solid with a thermostatic liquid, a movable actuator for actuation by the thermostatic fluid, movable means to vary the volumetric capacity of said relatively large bulb element at which said fluid will actuate said actuator, and yieldable means opposing movement of said movable means.

10. In a control device, a base member, a movable switch arm, a magnet arranged to attract said switch arm, a supporting member for said magnet and spaced from said base member, a contact member cooperable with said switch arm to control an electric circuit, said contact member being carried by said supporting member and extending into the space between said magnet and said base member, said contact member being movably adjustable toward and away from said switch arm, a curved wall portion on said base member, and an adjustment arm positioned between said magnet and said base member for adjusting said contact member relative to said supporting member, said arm having a portion cooperable with and engaging said wall portion to hold said arm in adjusted position.

11. A temperature responsive device comprising an hermetically sealed tubular bulb element having a plurality of wall apertures, a pressure responsive member closing and sealing one of said apertures, a second bulb element responsive to changes in condition, means communicatively connecting the interiors of said elements, control means operable by said responsive member, and yieldable means closing and sealing the other of said apertures, said yieldable means being so constructed and arranged relative to said responsive means so as to limit the maximum pressure in said first-named element, said elements and said connecting means being charged solid with liquid.

12. A temperature responsive device comprising an hermetically sealed tubular bulb element having a plurality of wall apertures, a pressure responsive member closing and sealing one of said apertures, a second bulb element, means communicatively connecting the interiors of said elements, control means operable by said responsive member, an expansible-contractible member closing and sealing the other of said apertures, said elements and said connecting means being charged solid with liquid, a spring resisting movement of said expansible-contractible member by the pressure of said liquid, and means acting through said spring to adjust said expansible-contractible member to regulate the volumetric capacity of said tubular element at which said responsive member will operate said control means.

13. A temperature responsive device comprising an hermetically sealed tubular bulb element having an aperture in its side wall and having an open end, a pressure responsive member closing and sealing said side wall aperture, an expansible-contractible member sealing said open end, a supporting member within and extending transversely of said bulb element, said supporting member having a guide aperture concentric with said expansible-contractible member, a thrust member secured to and extending through said expansible-contractible member and having a portion projecting through said supporting member aperture for guiding said thrust member, spring means acting on said thrust member and tending to move said expansible-contractible member to increase the volumetric capacity of said bulb element, yieldable means resisting movement of said expansible-contractible member by said spring means, said bulb element containing an expansible-contractible fluid responsive to temperature change, and a controlling means operatively connected to and operable by movement of said pressure responsive member.

EARNEST J. DILLMAN.